(12) United States Patent
Schell et al.

(10) Patent No.: US 6,927,932 B1
(45) Date of Patent: Aug. 9, 2005

(54) FILTER FOR DISK DRIVE BI-PHASE SERVO DEMODULATION

(75) Inventors: David L. Schell, Fort Collins, CO (US); Kevin G. Christian, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 601 days.

(21) Appl. No.: 09/927,662

(22) Filed: Aug. 10, 2001

(51) Int. Cl.[7] ............................................. G11B 5/035
(52) U.S. Cl. ...................................................... 360/65
(58) Field of Search ............................. 360/48, 49, 50, 360/72.2, 46, 65, 31, 51

(56) References Cited

U.S. PATENT DOCUMENTS

| | | | | |
|---|---|---|---|---|
| 5,341,249 A | * | 8/1994 | Abbott et al. ................. | 360/46 |
| 5,442,498 A | * | 8/1995 | Cheung et al. ................. | 360/48 |
| 6,122,120 A | * | 9/2000 | Shimoda ....................... | 360/46 |
| 6,160,673 A | * | 12/2000 | Izumi et al. .................... | 360/46 |
| 6,590,728 B1 | * | 7/2003 | Yang ............................ | 360/48 |

* cited by examiner

*Primary Examiner*—David Hudspeth
*Assistant Examiner*—Glenda P. Rodriguez
(74) *Attorney, Agent, or Firm*—Christopher P. Maiorana P.C.

(57) ABSTRACT

An apparatus comprising a sampler circuit and a filter circuit. The sampler circuit may be configured to generate a digital signal in response to a pre-amplified signal. The filter circuit may be configured to generate a track ID signal in response to the digital signal. The filter circuit may also be configured to (i) improve or increase signal-to-noise ratio (SNR) and (ii) reject DC offset errors.

26 Claims, 5 Drawing Sheets

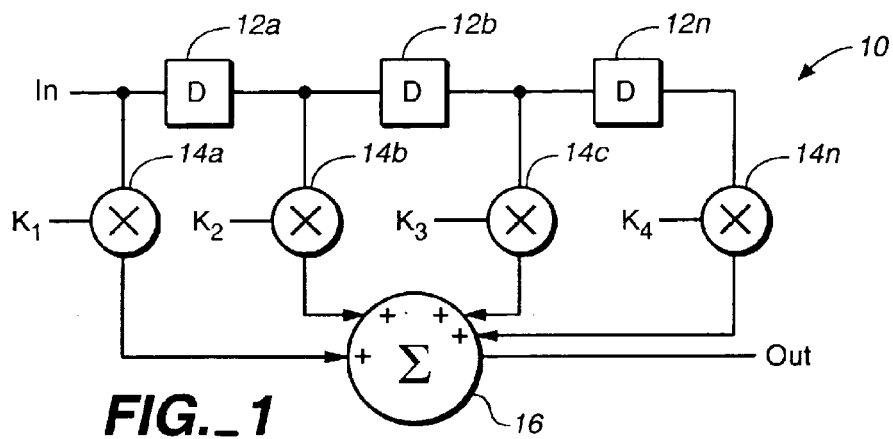
FIG._1
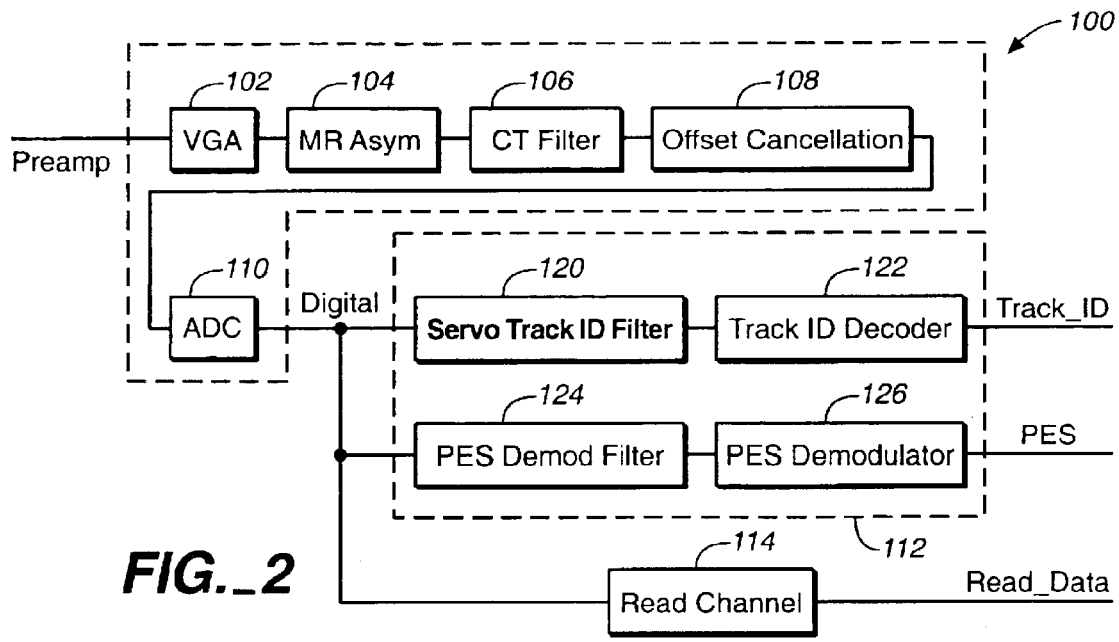
FIG._2
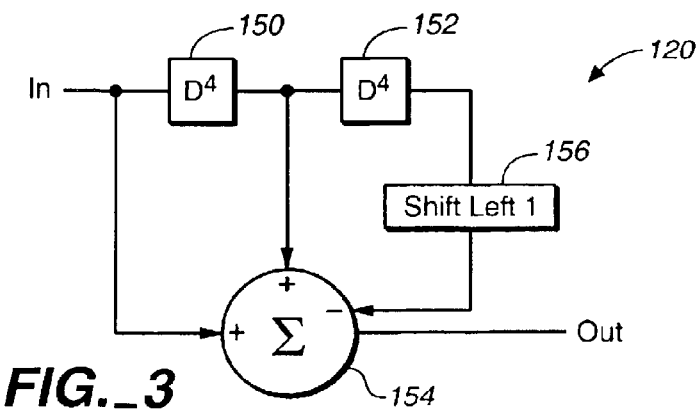
FIG._3

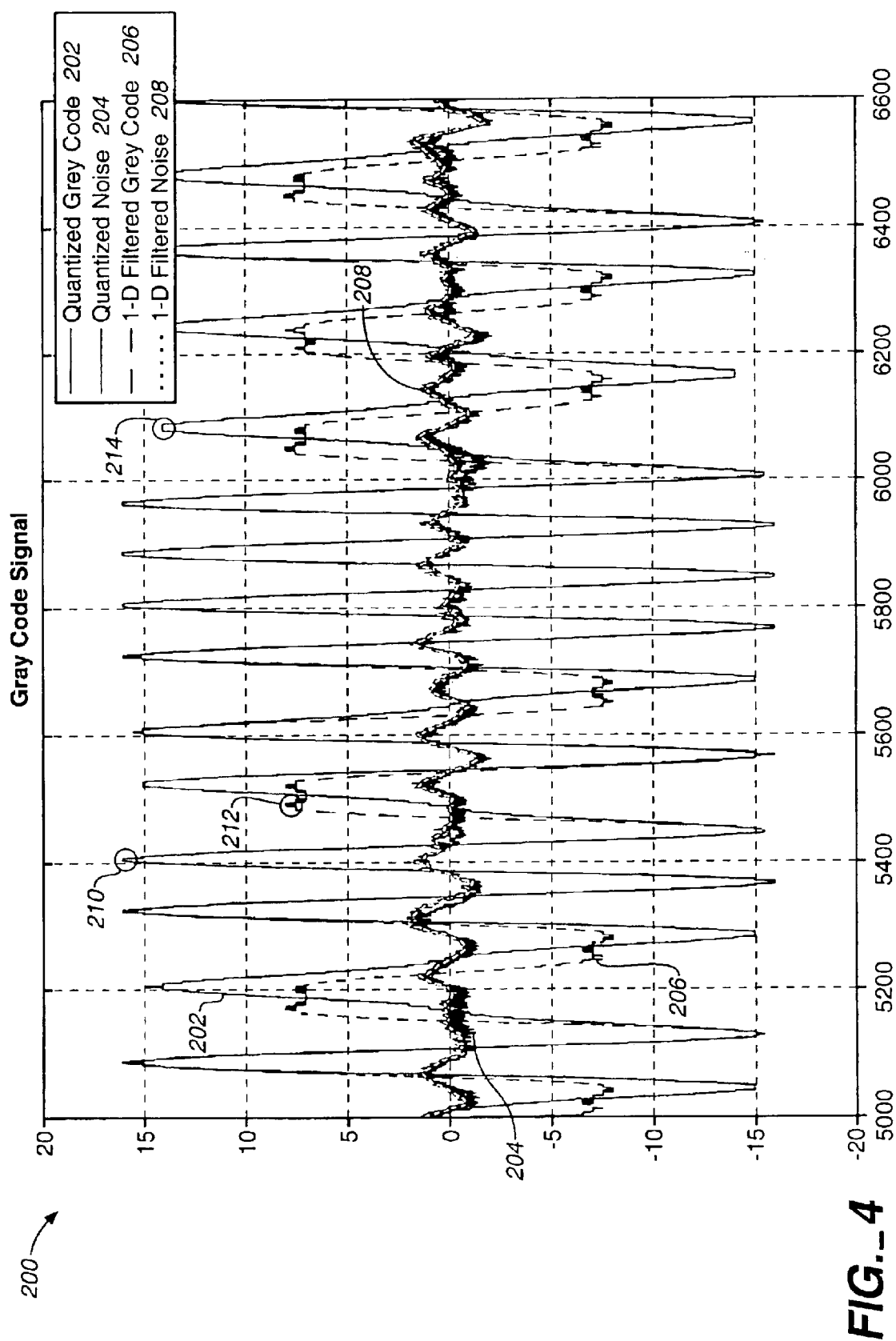
FIG._4

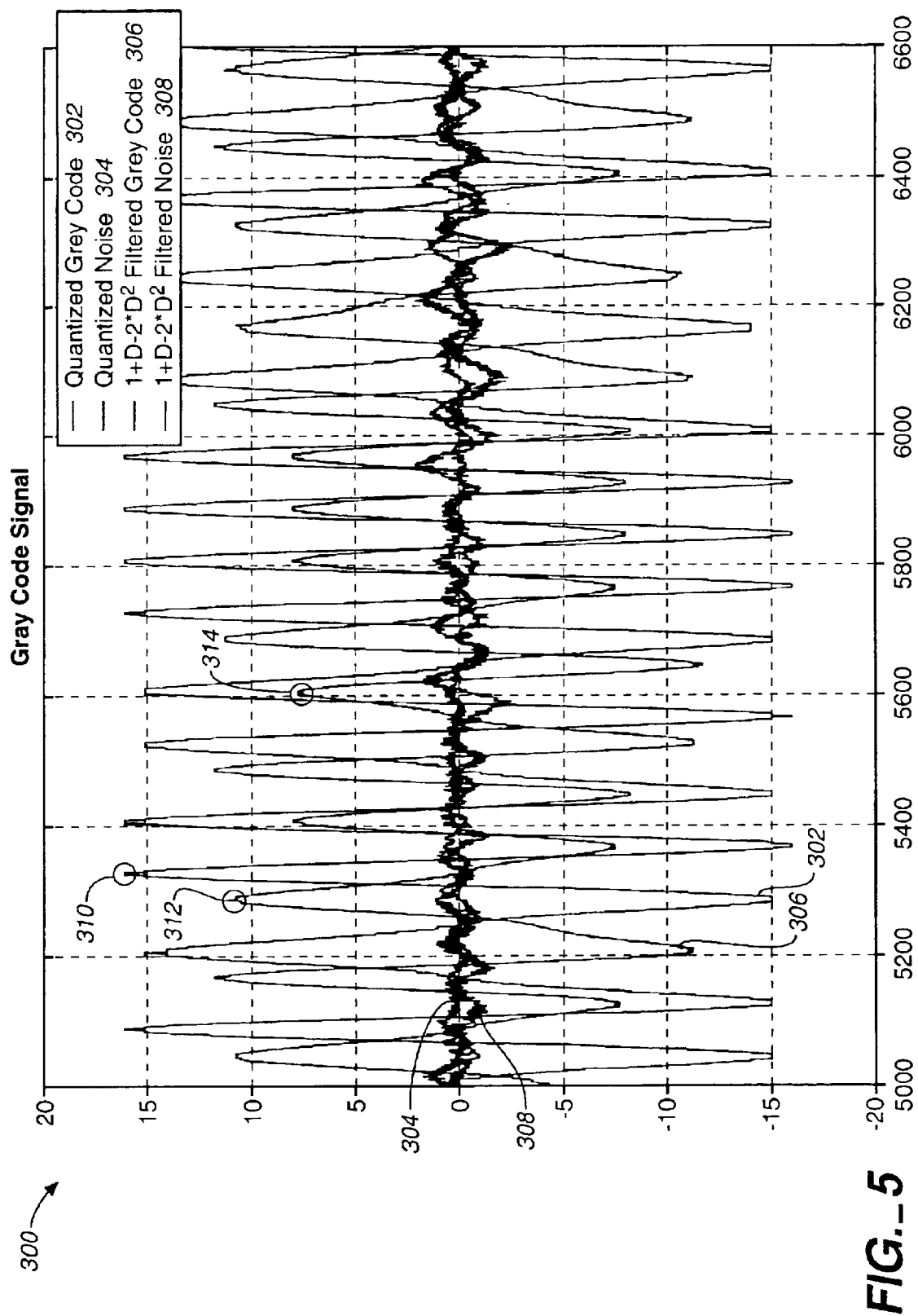
FIG._5

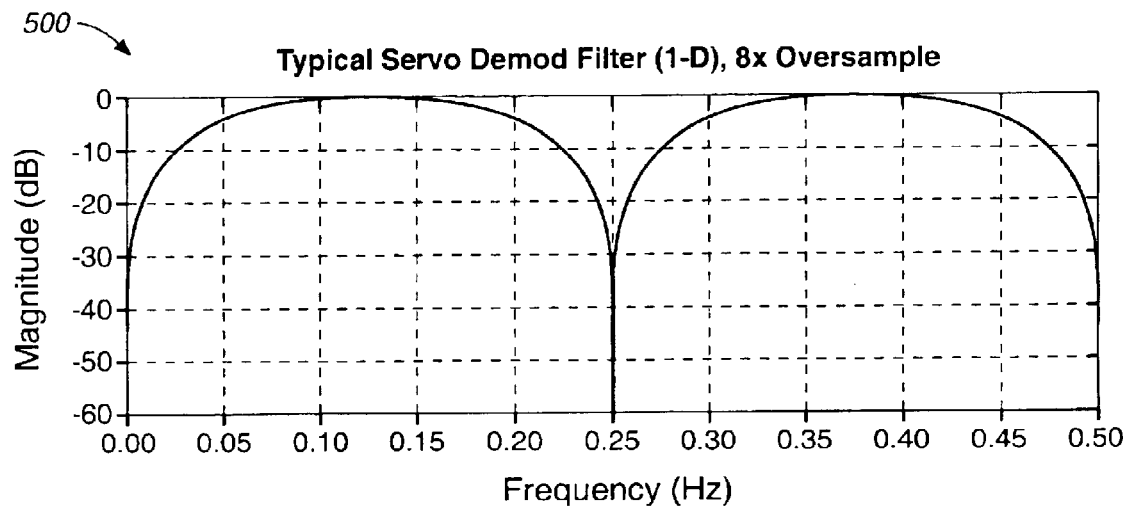
FIG._6a
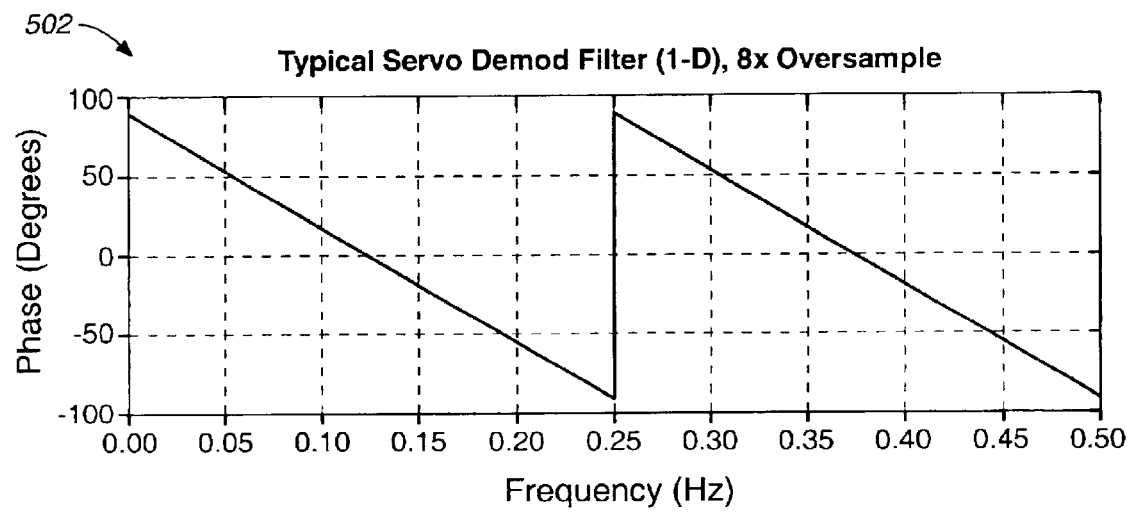
FIG._6b

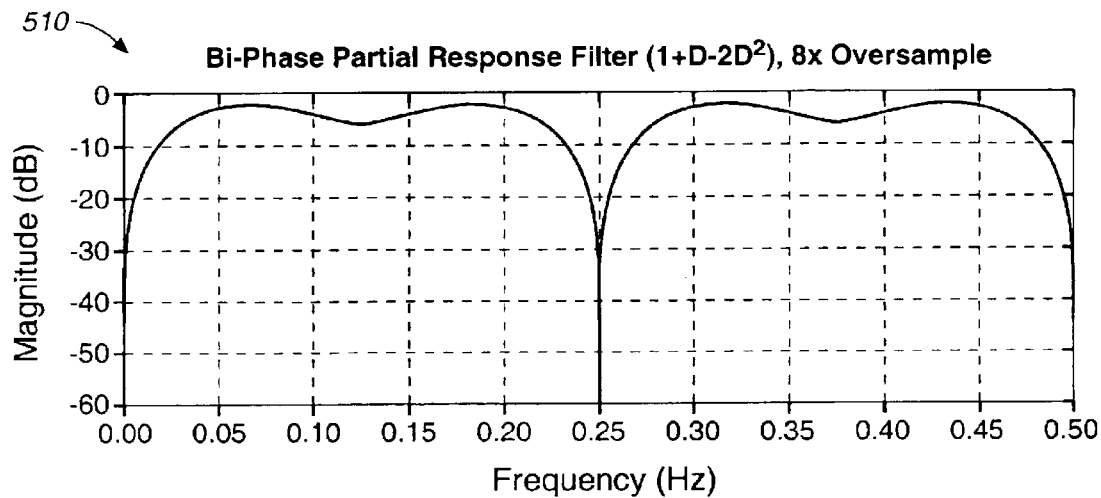
FIG._7a
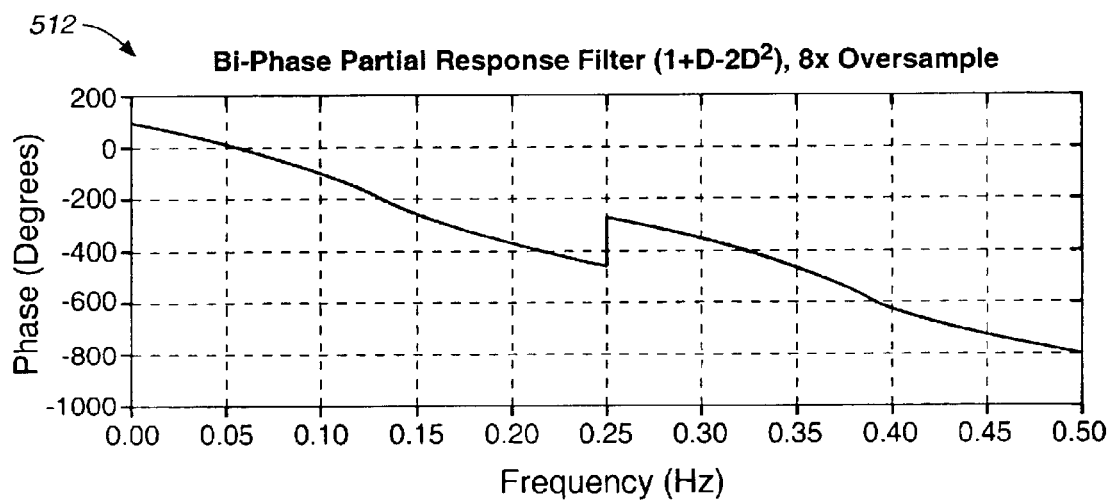
FIG._7b

FILTER FOR DISK DRIVE BI-PHASE SERVO DEMODULATION

FIELD OF THE INVENTION

The present invention relates to a method and/or architecture for implementing servo demodulators for hard disk drives generally and, more particularly, to a method and/or architecture for implementing a filter to provide bi-phase servo demodulation.

BACKGROUND OF THE INVENTION

Conventional servo track ID demodulators for hard disk drives (HDD) implement simple (i.e., 1-D) digital filters. Such simplistic digital filters have poor signal to noise ratio (SNR). However, as signal to noise ratios decrease with improving read channels, it becomes necessary to improve the SNR capability of the digital filters and therefore servo track ID demodulators.

Referring to FIG. 1, a typical 4 tap finite impulse response (FIR) filter 10 is shown. The filter 10 includes delay elements 12a–12n, multipliers 14a–14n and a summation circuit 16. The delay elements 12a–12n delay the sampled input signal IN. Each of the delay element signals is then presented to the multipliers 14a–14n. An output of each of the multipliers is then presented to the summation circuit 16. The summation circuit 16 presents the output signal OUT. The filter 10 has an output/input transfer function of:

$$\text{OUT/IN} = K_1 + K_2 D + K_3 D^2 + K_4 D^3$$

Some typical servo track ID demodulators do not implement digital filters. By not implementing digital filters the SNR of the track ID signal is typically about 3.5 dB better than using differentiation. However, implementations without digital filters are susceptible to DC offsets and thermal asperity.

SUMMARY OF THE INVENTION

The present invention concerns an apparatus comprising a sampler circuit and a filter circuit. The sampler circuit may be configured to generate a digital signal in response to a pre-amplified signal. The filter circuit may be configured to generate a track ID signal in response to the digital signal. The filter circuit may also be configured to (i) improve signal-to-noise ratio (SNR) and (ii) reject DC offset errors.

The objects, features and advantages of the present invention include providing a method and/or architecture for implementing a filter to provide bi-phase servo demodulation that may (i) improve a signal to noise ratio (SNR), (ii) maintain a simple implementation, (iii) implement a built in high pass function, and/or (iv) be immune to DC shifts from small thermal asperities.

BRIEF DESCRIPTION OF THE DRAWINGS

These and other objects, features and advantages of the present invention will be apparent from the following detailed description and the appended claims and drawings in which:

FIG. 1 is a block diagram of a typical 4 tap FIR filter;

FIG. 2 is a block diagram illustrating an implementation of the present invention;

FIG. 3 is a detailed block diagram of the servo ID filter of FIG. 2;

FIG. 4 is a timing diagram illustrating a typical gray code filtering operation;

FIG. 5 is a timing diagram illustrating an operation of the present invention;

FIGS. 6(a–b) are transfer functions of typical servo demodulator filters; and

FIGS. 7(a–b) are transfer functions of the present invention.

DETAILED DESCRIPTION OF THE PREFERRED EMBODIMENTS

Referring to FIG. 2, a block diagram of a circuit (or system) 100 is shown in accordance with a preferred embodiment of the present invention. The circuit 100 may provide an improved methodology and/or architecture for servo demodulators for hard disk drives (HDD). The circuit 100 may provide a digital filter that does not overly attenuate high frequencies and rejects low frequencies. The circuit 100 may provide a partial response filter with a greater than 2 dB improvement when compared to typical signal to noise ratios (SNR) of conventional servo track ID filters.

In one implementation, the circuit 100 may be implemented as a read channel front end. The circuit 100 generally comprises a sampler block (or circuit) 101, a servo block (or circuit) 112 and a read channel 114. The sampler may receive a pre-amplifier signal (e.g., PREAMP) and generate a signal (e.g., DIGITAL). The signal PREAMP may be generated by a preamplifier (not shown). The signal DIGITAL may be implemented as a digital signal. The sampler 101 may generate the signal DIGITAL in response to the signal PREAMP.

The sampler 101 generally comprises a voltage controlled gain amplifier (VGA) 102, a magneto-resistive head asymmetry correction circuit 104, a continuous time filter 106, an offset cancellation block (or circuit) 108 and an analog to digital converter (ADC) block (or circuit) 110. The VGA 102 may receive the signal PREAMP. Since magneto-resistive disk drive heads may not necessarily have a symmetric response, the correction circuit 104 may compensate for the asymmetry before the signal is filtered. The circuits 102–110 may be connected in a series configuration. The ADC 110 may generate the signal DIGITAL. The signal DIGITAL may be presented to the servo block 112 and the read channel 114. The servo block 112 may generate a signal (e.g., TRACK_ID) and a signal (e.g., PES). The signal TRACK_ID may be implemented as a track ID demodulated signal. The read channel 114 may generate a signal (e.g., READ_DATA).

The servo block 112 generally comprises a filter 120, a decoder 122, a filter 124 and a demodulator 126. In one example, the filter 120 may be implemented as a servo track ID filter. The decoder 122 may be implemented as a track ID decoder. The filter 124 may be implemented as a position error signal (PES) filter. The demodulator 126 may be implemented as a PES demodulator. The track ID decoder 122 may generate the signal TRACK_ID. The PES demodulator 126 may generate the signal PES.

The servo block 112 may have two main functions (i) generation of the position error signal PES (via the PES demodulator filter 124 and the PES demodulator 126) and (ii) track ID decoding (via the servo track ID filter 120 and the track ID decoder 122).

The filter 120 may closely match and filter input data from the ADC 110. The circuit 120 may be capable of rejecting DC errors and provide improved SNR. The filter 120 may improve SNR and maintain a simple implementation. The circuit 100 may also have a built in high pass function that may allow the demodulator 100 to be immune to DC shifts from small thermal asperities. The filter 120 may be implemented as a 1+D−2*D^2 filter.

Referring to FIG. 3, a detailed block diagram of the filter 120 is shown. The filter 120 generally comprises a delay element 150, a delay element 152, a summation circuit 154 and a shift left circuit 156. In one example, the delay elements 150 and 152 may be implemented as 4th order delay elements. However, the order of the delay elements 150 and 152 may be varied in order to meet the criteria of a particular implementation. For example, the delay elements 150 and 152 may be implemented 1st order for a 2× over sample, 2nd order for a 4× over sample, 3rd order for a 6× over sample, 4th order for an 8× over sample, etc.

An input signal (e.g., IN) may be an output of the ADC 110 (of FIG. 2). The signal IN may be presented to the delay element 150 and to the summation circuit 154. The delay element 150 may present an output to the delay element 152 and the summation circuit 154. The delay element 152 may present a signal to the shift left circuit 156. The shift left circuit 156 may be configured to shift the output of the delay element 152 left 1 bit. The outputs of the shift left circuit 156 may then be presented to the summation circuit 154. The summation circuit 154 may be configured to add the signal IN and the output of the delay element 150, while subtracting the output of the shift left circuit 156. The summation circuit 154 may then present a signal (e.g., OUT). The signal OUT may be an input of the track ID decoder 122 (of FIG. 2). The filter 120 may provide a configuration such that $1+D^4-2D^8$ filtering is achieved. The filter 120 may not need any multipliers. Therefore, hardware implementation of the filter 120 may be easier and may operate faster than prior architectures.

The circuit 120 may provide a simple and fast (e.g., high clock rate) digital filter. The digital filter 120 may be applicable to a variety of different implementations. The circuit 120 may also allow coefficients of the ADC 110 output signal to be simple, and preferably one, such that no additional multipliers are required. The circuit 120 may therefore provide improved SNR with DC rejection.

Referring to FIG. 4, a timing diagram 200 illustrating unfiltered and typical differentiated (e.g., 1−D^4) gray code operations are shown. The timing diagram 200 illustrates quantized gray code 202, quantized noise 204, 1-D filtered gray code 206 and 1-D filtered noise 208. At a point 210 the 1-D filtered gray code 206 at 5400 may have an amplitude of 16 and at a point 212 the filtered gray code 206 at 5475 may have an amplitude of 7.5. The RMS quantized noise may be 26.18 dB less than a peak quantized gray code of the present invention (26.18=20log(16/0.785), where 0.785 may be the RMS quantized noise). The minimum quantized gray code peak 214 may be 1.16 dB less than the largest quantized gray code peak 210 (1.16 dB=20log(16/14)). The peak detect total SNR may then be (26.18−1.16)dB=25.02 dB. The 1-D peak 210 may be 28.01 dB greater than the RMS 1-D filtered noise 208 (28.01=20log(16/0.636), where 0.636 may be the RMS). The 1-D minimum peak 212 may be 6.58 dB lower than the 1-D maximum peak 210 (−6.58 dB=20log (7.5/16)). The total SNR for 1-D filtered signal may be 21.43 dB (28.01−6.58).

Referring to FIG. 5, a timing diagram 300 illustrating unfiltered and improved filtered (e.g., 1+D−2*D^2) gray code operations are shown. The timing diagram 300 illustrates quantized gray code 302, quantized noise 304, 1+D−2*D^2 filtered gray code 306 and 1+D−2*D^2 filtered noise 308. At a point 312 the 1+D−2*D^2 filtered gray code 306 at 5275 may have an amplitude of 11. At a point 310 the quantized gray code 302 at 5310 may have an amplitude of 16. The quantized gray code total SNR of the timing diagram 300 may be the same as the timing diagram 200 (e.g., 25.02 dB). The minimum peak amplitude of the 1+D−2D^2 filtered signal 314 may be 3.9 dB lower than the peak 312 (20log (7/11)). The SNR of the maximum peak 312 to the RMS 1+D−2D^2 noise may be 27.48 dB. The filter 120 may provide a final 1+D−2D^2 SNR of 23.58 dB. The 1+D−2D^2 filter 120 may result in improved SNR over the 1-D filter 10 and DC reject improvement over filterless implementations.

Since servos track IDs are typically 8 times over sampled, the filtering implementation of the filter 120 may be 1+D^4−2*D^8. The results of modeling the servo demodulator filters of the typical methodology (e.g., 1−D^4) and the present invention (e.g., 1+D^4−2*D^8) are shown in the following TABLE 1:

TABLE 1

|  | Peak Detect | $1 - D^4$ | $1 + D^4 - 2*D^8$ |
|---|---|---|---|
| Filtered SNR, dB | 26.18 | 28.01 | 27.48 |
| Min Peak to Max Peak, dB | −1.16 | −6.58 | −3.90 |
| Total SNR, dB | 25.02 | 21.43 | 23.58 |
| DC reject | NO | YES | YES |

Referring to FIGS. 6(a–b), frequency response diagrams 500 and 502 illustrating a typical servo demodulation filter transfer function (e.g., 1-D) with 8 times oversampling is shown. FIG. 6a illustrates a magnitude (dB) verse frequency (Hz) graph. FIG. 6b illustrates a phase (degrees) verse frequency (Hz) graph.

Referring to FIGS. 7(a–b), frequency response diagrams 510 and 512 illustrating a bi-phase partial response filter (e.g., 1+D−2D^2) with 8 times oversampling is shown. FIG. 7a illustrates a magnitude (dB) verse frequency (Hz) graph. FIG. 7b illustrates a phase (degrees) verse frequency (Hz) graph.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a sampler circuit configured to generate a digital signal in response to a pre-amplified signal; and
   a filter circuit configured to generate a track ID signal in response to said digital signal, wherein said filter circuit is configured (i) as a three-tap filter and (ii) to reject a DC offset error in said digital signal, wherein said track ID signal has a signal-to-noise ratio of at least 23.58 dB.

2. The apparatus according to claim 1, wherein said filter circuit is further configured to implement each tap multiplication coefficients as an integer.

3. The apparatus according to claim 1, wherein said filter circuit is configured to implement multiplication coefficients of one.

4. The apparatus according to claim 1, wherein said filter circuit is immune to DC offsets and shifts from thermal asperities.

5. The apparatus according to claim 1, wherein said filter circuit is further configured to attenuate high frequencies.

6. The apparatus according to claim 5, wherein said filter circuit is configured to reject low frequencies.

7. The apparatus according to claim 1, wherein said filter circuit is further configured to closely match said digital signal.

8. The apparatus according to claim 1, wherein said sampler circuit comprises:
   a voltage gain amplifier configured to receive said pre-amplified signal; and
   a magneto-resistive head asymmetry correction circuit coupled to said voltage gain amplifier.

9. The apparatus according to claim 8, wherein said sampler circuit further comprises:
   a continuous time filter coupled to said magneto-resistive asymmetry correction circuit;
   an offset cancellation circuit coupled to said continuous time filter; and
   an analog to digital conversion circuit configured to generate said digital signal and coupled to said offset cancellation circuit.

10. The apparatus according to claim 1, wherein said filter circuit comprises:
    a digital filter circuit configured to generate a filtered track ID signal; and
    a position error signal (PES) filter configured to generate a filtered PES signal in response to said digital signal.

11. The apparatus according to claim 10, wherein said filter circuit further comprises:
    a track ID decoder configured to generate said track ID signal in response to said filtered track ID signal; and
    a PES demodulator configured to generate a PES signal in response to said filtered PES signal.

12. The apparatus according to claim 1, further comprising:
    a read channel circuit configured to generate a read data signal in response to said digital signal.

13. The apparatus according to claim 1, wherein said filter circuit comprises:
    a plurality of delay elements configured to delay said digital signal; and
    a summation circuit configured to perform summation of said delayed digital signals and provide an output filtered signal.

14. The apparatus according to claim 1, wherein said filter circuit comprises:
    a first delay element configured to receive said digital signal and present a first delayed signal;
    a second delay element configured to receive said first delayed signal and present a second delayed signal; and
    a shift left circuit configured to receive said second delayed signal and present a shifted signal.

15. The apparatus according to claim 14, wherein said filter circuit further comprises:
    a summation circuit configured to generate a filtered output signal by summing said digital signal, said first delayed signal and said shifted signal.

16. The apparatus according to claim 1, wherein said filter circuit comprises a first and a second 4th order delay elements.

17. The apparatus according to claim 1, wherein said track ID signal comprises a servo track ID signal.

18. The apparatus according to claim 1, wherein said filter circuit comprises:
    a servo track ID filter configured to generate said track ID signal in response to said digital signal.

19. The apparatus according to claim 1, wherein said filter circuit is configured as a $1+D-2D^2$ filter.

20. A method for improved filter bi-phase servo demodulation, comprising the steps of:
    (A) generating a digital signal in response to a pre-amplified signal;
    (B) generating a track ID signal in response to three-tap filtering said digital signal; and
    (C) rejecting a DC offset error in said digital signal, wherein said three-tap filtering comprises $1+D^4-2D^8$ filtering.

21. The method according to claim 20, wherein all tap multiplication coefficients of said three-tap filtering comprise integers.

22. The method according to claim 20, wherein step (B) further comprises the sub-steps of:
    delaying said digital signal to generate a first delayed signal;
    delaying said first delayed signal to generate a second delayed signal; and
    shifting said second delayed signal to generate a shifted signal.

23. The method according to claim 22, wherein step (B) further comprises the sub-step of:
    summing said digital signal, said first delayed signal and said shifted signal to generate a filtered output signal.

24. The method according to claim 20, wherein step (C) further comprises:
    attenuating high frequencies; and
    rejecting low frequencies.

25. An apparatus comprising:
    a sampler circuit configured to generate a digital signal in response to a pre-amplified signal;
    a filter circuit configured to generate a track ID signal in response to said digital signal, wherein said filter circuit is configured (i) as a three-tap filter and (ii) to reject a DC offset error in said digital signal, wherein said filter circuit comprises (i) a first delay element configured to receive said digital signal and present a first delayed signal, (ii) a second delay element configured to receive said first delayed signal and present a second delayed signal, and (iii) a shift left circuit configured to receive said second delayed signal and present a shifted signal.

26. The apparatus according to claim 25, wherein said track ID signal has a signal-to-noise ratio of at least 23.58 dB.

* * * * *